US012699247B2

(12) United States Patent
Lee et al.

(10) Patent No.: US 12,699,247 B2
(45) Date of Patent: Aug. 4, 2026

(54) LENS DRIVING APPARATUS AND CAMERA MODULE INCLUDING THE SAME

(71) Applicant: Samsung Electro-Mechanics Co., Ltd., Suwon-si (KR)

(72) Inventors: Ho-Jae Lee, Suwon-si (KR); Seok Hwan Kim, Suwon-si (KR); Yeook Jeon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 334 days.

(21) Appl. No.: 18/482,222

(22) Filed: Oct. 6, 2023

(65) Prior Publication Data

US 2024/0361559 A1 Oct. 31, 2024

(30) Foreign Application Priority Data

Apr. 28, 2023 (KR) ........................ 10-2023-0056248

(51) Int. Cl.
*G02B 7/02* (2021.01)
*G03B 17/12* (2021.01)
*G03B 19/04* (2021.01)

(52) U.S. Cl.
CPC ............. *G02B 7/023* (2013.01); *G03B 17/12* (2013.01); *G03B 19/04* (2013.01)

(58) Field of Classification Search
CPC .......... G02B 7/021; G02B 7/023; G02B 7/02; G02B 7/08; G02B 7/025; G02B 7/04; G03B 13/36; G03B 17/12; G03B 5/00;

G03B 3/10; F16C 33/30; F16C 33/303; F16C 33/32; F16C 33/34; H04N 23/57; H04N 23/54; H04N 23/687
See application file for complete search history.

(56) References Cited

U.S. PATENT DOCUMENTS

| | | | | | |
|---|---|---|---|---|---|
| 3,491,423 | A | * | 1/1970 | Haller ..................... | F16C 33/32 |
| | | | | | 428/685 |
| 5,967,670 | A | * | 10/1999 | Gabelli ................... | F16C 33/32 |
| | | | | | 384/492 |
| 5,971,620 | A | * | 10/1999 | Gabelli ................... | F16C 33/64 |
| | | | | | 384/492 |

(Continued)

FOREIGN PATENT DOCUMENTS

| | | | |
|---|---|---|---|
| JP | 10-47357 | A | 2/1998 |
| JP | 6619946 | B2 | 12/2019 |

(Continued)

OTHER PUBLICATIONS

Korean Office Action issued on Jun. 20, 2025, in Counterpart Korean Patent Application No. 10-2023-0056248 (6 pages in English, 6 pages in Korean).

(Continued)

*Primary Examiner* — Ephrem Z Mebrahtu
(74) *Attorney, Agent, or Firm* — NSIP Law

(57) ABSTRACT
A lens driving apparatus is provided. The lens driving apparatus includes a first frame which accommodates a lens; a driver, connected to the first frame, and configured to generate a driving force to move the first frame in a first direction; and a group of rolling members that include at least one multi-layered rolling member including two or more different materials, wherein the group of rolling members at least partially contacts the first frame.

16 Claims, 7 Drawing Sheets

(56) References Cited

U.S. PATENT DOCUMENTS

| | | | |
|---|---|---|---|
| 2015/0198201 A1 | 7/2015 | Halladay et al. | |
| 2016/0154251 A1 | 6/2016 | Ladwig et al. | |
| 2021/0231904 A1 | 7/2021 | Son et al. | |
| 2022/0187616 A1 | 6/2022 | Lee | |
| 2023/0251550 A1* | 8/2023 | Go | ........................... G03B 5/00 |

FOREIGN PATENT DOCUMENTS

| | | |
|---|---|---|
| KR | 10-1997-0075421 A | 12/1997 |
| KR | 10-1452694 B1 | 10/2014 |
| KR | 10-2017-0001470 A | 1/2017 |
| KR | 10-2017-0090426 A | 8/2017 |
| KR | 10-1790246 B1 | 11/2017 |
| KR | 10-2020-0020147 A | 2/2020 |
| KR | 10-2022-0083546 A | 6/2022 |

OTHER PUBLICATIONS

Korean Notice of Allowance issued on Feb. 5, 2026, in Counterpart Korean Patent Application No. 10-2023-0056248 (1 page in English, 2 pages in Korean).

* cited by examiner

LENS DRIVING APPARATUS AND CAMERA MODULE INCLUDING THE SAME

CROSS-REFERENCE TO RELATED APPLICATIONS

This application claims the benefit under 35 USC § 119(a) of Korean Patent Application No. 10-2023-0056248 filed on Apr. 28, 2023, in the Korean Intellectual Property Office, the entire disclosure of which is incorporated herein by reference for all purposes.

BACKGROUND

1. Field

The following description relates to a lens driving apparatus and a camera module including the same.

2. Description of Related Art

With the development of information and communication technology and semiconductor technology, the manufacture and implementation of electronic devices has increased. Recently, cameras have been adopted in portable electronic devices such as, but not limited to, smartphones, tablet personal computers (PCs), and laptop computers, and an auto focus (AF) operation, an image stabilization (IS) operation, and a zoom operation may be added to cameras of these portable electronic devices.

The image stabilization operation may include both camera shake compensation and hand shake compensation, and by implementing the image stabilization operation, it is possible to prevent an image of a subject being photographed from vibrating due to the unintentional occurrence of hand shake or camera shake by a photographer in a moving or stationary state of the camera.

The auto focus operation is an operation that enables a clear image to be acquired from an imaging plane of an image sensor by moving a lens positioned in front of the image sensor along an optical axis direction according to a distance from the subject.

Recently, there has been a trend in smartphone camera module technology to increase the resolution of image sensors and apply larger pixel sizes to obtain high-quality images. As a result, the number of lenses may increase, the size of the lens may increase, and the weight of the lens may increase. Accordingly, the improvement of the effects of drop impact is desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens driving apparatus includes a first frame which accommodates a lens; a driver, connected to the first frame, and configured to generate a driving force to move the first frame in a first direction; and a group of rolling members comprising at least one multi-layered rolling member including two or more different materials, wherein the group of rolling members at least partially contacts the first frame.

The rolling members of the group of rolling members may have a ball shape.

The at least one multi-layered rolling member may include a core part and an outer part that surrounds the core part, and the outer part may be formed of a material that is different from a material of the core part.

The material of the core part may have a lower modulus of elasticity than a modulus of elasticity of the material of the outer part.

The core part may include a plastic material.

The outer part may include a ceramic material.

A radius of the core part may be equal to or greater than 70% of a radius of the at least one multi-layered rolling member, and equal to or less than 90% of the radius of the at least one multi-layered rolling member.

The lens driving apparatus may further include a second frame disposed below the first frame; and a first rolling groove disposed between the first frame and the second frame, and configured to accommodate at least a portion of the group of rolling members to guide a movement in the first direction.

The first direction may be an optical axis direction, two or more rolling members of the group of rolling members are stacked in the optical axis direction, and are disposed in the first rolling groove; and at least one of the rolling members disposed at an outermost portion of the first rolling groove is the at least one multi-layered rolling member.

The at least one multi-layered rolling member may be disposed at the outermost portion of the first rolling groove closest to a direction on which the light is incident.

The driver may include a first driver configured to generate a driving force to move the first frame in the first direction; and a second driver configured to generate a driving force to move the first frame in a second direction different from the first direction.

The lens driving apparatus may include a third frame disposed below the second frame, and a second rolling groove disposed between the second frame and the third frame and configured to accommodate at least a portion of the group of rolling members to guide a movement in the second direction different from the first direction.

The first rolling groove and the second rolling groove may each be configured to accommodate at least one or more of the at least one multi-layered rolling members.

An electronic device may include the lens driving apparatus.

In a general aspect, a camera module includes a lens; a first frame which accommodates the lens; a second frame disposed below the first frame; a driver, connected to the first frame, and configured to generate a driving force to move the first frame in a first direction; and a plurality of rolling members that is disposed between the first frame and the second frame and at least partially contacts the first frame, wherein at least one of the plurality of rolling members is a multi-layered rolling member including two or more different materials.

The multi-layered rolling member may include a core part and an outer part surrounding the core part, and wherein the outer part may be formed of a material that is different from a material of the core part.

The material of the core part may have a lower modulus of elasticity than a modulus of elasticity of the material of the outer part.

The core part may include a plastic material, and the outer part may include a ceramic material.

A radius of the core part may be equal to or greater than 70% of a radius of the multi-layered rolling member, and equal to or less than 90% of the radius of the multi-layered rolling member.

An electronic device may include the camera module.

Other features and aspects will be apparent from the following detailed description, the drawings, and the claims.

Figure 1:
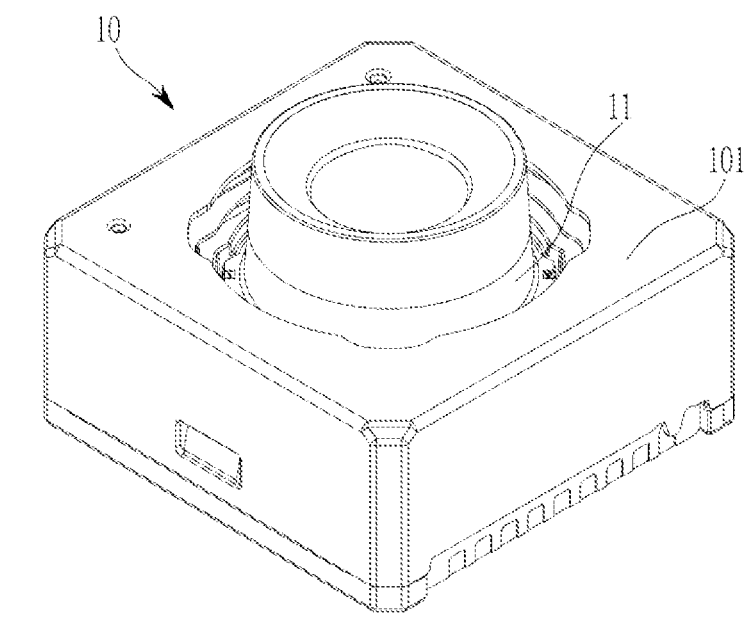
FIG. 1 illustrates a perspective view of an appearance of an example camera module, in accordance with one or more embodiments.
Figure 1:

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, an optical axis may be set as a central axis of a lens perpendicular to a lens surface, and an optical axis direction means a direction parallel to the central axis. In the figures, the optical axis is set as a z-axis, and an x-axis and a y-axis are set in directions perpendicular to the optical axis. In this example, the x-axis and the y-axis are perpendicular to each other, and an x-y plane formed by the x-axis and the y-axis becomes a plane perpendicular to the optical axis.

One or more examples may provide a lens driving apparatus that may prevent image deformation by maintaining high strength while improving impact resistance by reducing the maximum impact amount, and a camera module including the same.

One or more examples may provide a lens driving apparatus and a camera module which implements a bearing in which a material having a low elastic modulus and a high elastic modulus is disposed, the maximum amount of impact may be reduced to improve impact resistance, and deformation may be prevented by maintaining an external appearance of high rigidity.

Figure 2:
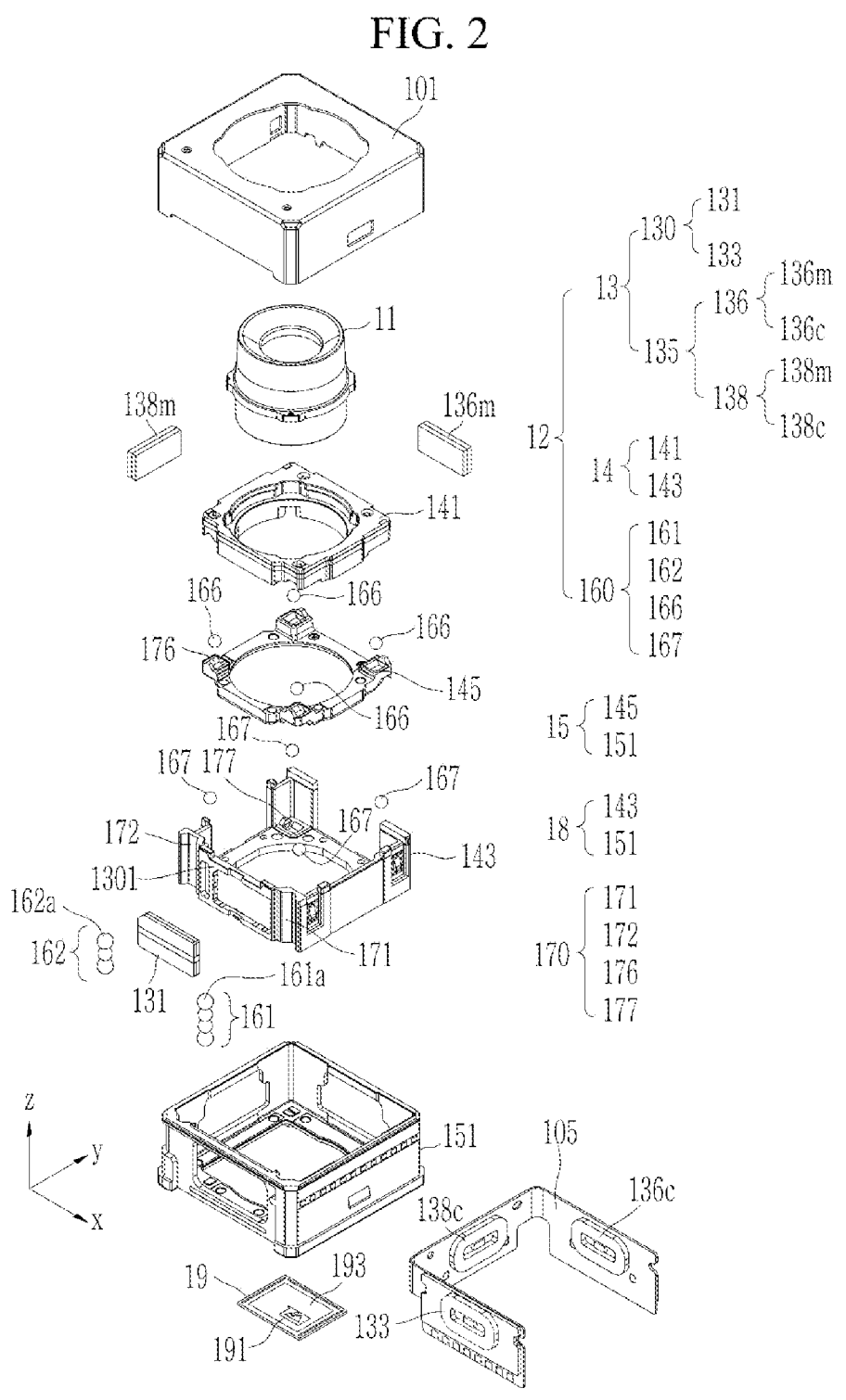
FIG. 2 illustrates a schematically exploded perspective view of the example camera module illustrated in FIG. 1.

FIG. 1 illustrates a perspective view of an appearance of an example camera module, in accordance with one or more embodiments, and FIG. 2 illustrates a schematically exploded perspective view of the example camera module illustrated in FIG. 1.

Referring to FIG. 1 and FIG. 2, an example camera module 10, in accordance with one or more embodiments, includes a lens barrel 11, a lens driving device 12 that moves the lens barrel 11, and an image sensor unit 19 that converts light incident through the lens barrel 11 into an electrical signal. Additionally, the lens barrel 11 is accommodated in a first frame 14, the first frame 14 is accommodated in a housing 151, and the housing 151 may be covered with a cover 101.

The lens barrel 11 may have a hollow cylindrical shape so that a plurality of lenses for imaging an image of a subject may be accommodated therein. One or a plurality of lenses may be mounted on the lens barrel 11. A plurality of lenses may be disposed as many as necessary according to an implementation of the lens barrel 11, and respective lenses may have the same or different optical characteristics, such as a refractive index.

The lens driving device 12 is a device that moves the lens barrel 11, and may include a driver 13 that provides a driving force to move the lens barrel 11 and a first frame 14 in which the driver 13 is disposed.

At least a portion of the driver 13 may be disposed in the first frame 14, so that the driver 13 may generate a driving force to move the first frame 14 in a first direction. The first direction may be an optical axis direction (a z-axis direction in the drawing, hereinafter referred to as a z-axis direction) or a direction perpendicular to the optical axis (an x-axis direction or a y-axis direction in the drawing). The driver 13 may include an auto focus (AF) driver 130 that adjusts focus and an optical image stabilization (OIS) driver 135 that corrects hand shaking or jiggling.

In an example, the lens driving device 12 may adjust the focus or implement a zoom operation by moving the lens barrel 11 in the optical axis direction (the z-axis direction) by using the AF driver 130, and may correct hand shaking or shaking during an imaging operation by moving the lens barrel 11 in the direction (the x-axis direction or the y-axis direction in the drawing) perpendicular to the optical axis direction (the z-axis direction) by using the OIS driver 135.

In an example, the AF driver 130 may include an AF driving magnet 131 and an AF driving coil 133. In an example, the AF driving magnet 131 may be mounted on the first frame 14, and the AF driving coil may be mounted on a second frame 15 disposed under the first frame 14. However, the one or more examples are not limited thereto, and it may be possible to exchange positions of the AF driving magnet 131 and the AF driving coil 133.

The lens driving device 12 may include a rolling member 160. The rolling member 160 may be disposed between the first frame 14 and the second frame 15 to reduce friction generated when the first frame 14 is moved. The rolling member 160 may be disposed in a ball rolling part 170 formed between the first frame 14 and the second frame 15 so that at least a part thereof may contact the first frame 14. The rolling member 160 may include an AF rolling member that reduces friction when the first frame 14 moves in the optical axis direction (the z-axis direction), and an OIS rolling member that reduces friction when the first frame 14 moves in a direction (the y-axis direction or the x-axis direction) perpendicular to the optical axis.

In an example, the first frame 14 may include a carrier 143 accommodating the lens barrel 11, and the second frame 15 may include a housing 151 accommodating the carrier 143. The AF driving magnet 131 may be mounted on the carrier 143, and the AF driving coil 133 may be mounted on the housing 151 via a substrate 105.

When power is applied to the AF driving coil 133, the first frame 14 may be moved in the optical axis direction (the z-axis direction) by electromagnetic influence between the AF driving magnet 131 and the AF driving coil 133. Since the lens barrel 11 is accommodated in the first frame 14, the focus may be adjusted while the lens barrel 11 is also moved in the optical axis direction (the z-axis direction) based on the movement of the first frame 14.

The AF driving magnet 131 may be mounted on an AF driving surface 1301 that is one surface of the first frame 14. In an example, the AF driving magnet 131 may be a moving member that is mounted on the AF driving surface 1301 and moves in the optical axis direction (the z-axis direction) together with the first frame 14. In an example, the second frame 15 may be a housing 151 accommodating the carrier 143, and the AF driving coil 133 may be a fixed member that is fixed to the housing 151.

In another example, the AF driver 130 may include a piezo element, a rod having one end connected to the piezo element, and a pad portion contacting the rod and being connected to the first frame 14. The piezo element may vibrate in the optical axis direction, and the rod may transmit the vibration of the piezo element to the first frame 14 through the pad portion. The first frame 14 may move in the optical axis direction, due to a difference between static inertia and frictional force.

The rolling member 160 disposed between the first frame 14 and the second frame 15 may be AF rolling members 161 and 162. The AF rolling members 161 and 162 may reduce friction when the first frame 14 is moved by the AF driver 130. The AF rolling members 161 and 162 may be disposed on both sides of the center of the AF driving surface 1301 in the width direction.

The ball rolling part 170 may be AF rolling parts or grooves 171 and 172 that accommodate the AF rolling members (or groups of rolling members) 161 and 162. The ball-shaped AF rolling members 161 and 162 may be disposed in the AF rolling parts 171 and 172. The AF rolling parts 171 and 172 may be formed as guide grooves so that the AF rolling members 161 and 162 are accommodated therein, and movement thereof in the optical axis direction is limited.

The AF rolling parts 171 and 172 may be disposed on both sides of the center of the AF driving surface 1301 in the width direction. The AF rolling parts 171 and 172 disposed on both sides of the AF driving surface 1301 thereof may accommodate different numbers of AF rolling members 161 and 162, respectively. In an example, the AF rolling part 171 on one side of the AF driving surface 1301 may accommodate four AF rolling members 161, and the AF rolling part 172 on the other side of the AF driving surface 1301 may accommodate three AF rolling members 162.

At least a portion of the OIS driver 135 may be disposed in the first frame 14, so that the OIS driver 135 may move the first frame 14 in the first direction. In this example, the first direction may be a direction perpendicular to the optical axis (the y-axis direction or the x-axis direction). The OIS driver 135 may include a first OIS driver 136 that provides a driving force so that the first frame 14 moves in a first horizontal direction (the y-axis direction) perpendicular to the optical axis direction (the z-axis direction), and a second OIS driver 138 that provides a driving force so that the first frame 14 moves in a second horizontal direction (the x-axis direction) perpendicular to the optical axis direction (the z-axis direction) and perpendicular to the first horizontal direction (the y-axis direction). In an example, the first frame may be a lens holder 141 or a carrier 143.

The first OIS driver 136 may include a first OIS driving magnet 136*m* and a first OIS driving coil 136*c*, and the second OIS driver 138 may include a second OIS driving magnet 138*m* and a first OIS driving coil 138*c*. The first and second OIS driving magnets 136*m* and 138*m* may be mounted on the first frame 14. The first frame 14 may have a substantially rectangular frame shape, and the first OIS driving magnet 136*m* and the second OIS driving magnet 138*m* may be disposed on two adjacent sides of the first frame 14. In an example, the first and second OIS driving coils 136*c* and 138*c* may be mounted on the housing 151 via the substrate 105.

The second frame 15 may be positioned below the first frame 14, and OIS rolling members 166 and 167 may be disposed between the first frame 14 and the second frame 15. The OIS rolling members 166 and 167 may be accommodated in the rolling part 170 disposed between the first frame 14 and the second frame 15 to reduce frictional force generated when the first and second OIS drivers 136 and 138 provide driving force to the first frame 14 to move in a direction perpendicular to the optical axis (the y-axis direction or the x-axis direction). Two or more OIS rolling members 166 and 167 may be disposed, and at least one of them may contact first frame 14. For example, the first frame 14 may be the lens holder 141 and the second frame 15 may be the carrier 143, while the first frame 14 may be the carrier 143 and the second frame 15 may be the housing 151.

The first OIS rolling member 166 may be disposed between the first frame 14 and the second frame 15. The first OIS rolling member 166 may be accommodated in a first OIS rolling part 176 between the first frame 14 and the second frame 15. The first OIS rolling member 166 may be accommodated in the first OIS rolling part 176 and may be formed as a guide groove to limit movement in the first horizontal direction (the y-axis direction) perpendicular to the optical axis. The first OIS rolling member 166 may reduce frictional force generated when the first frame 14 moves in the first horizontal direction (the y-axis direction).

A third frame 18 may be disposed below the second frame 15. The second OIS rolling member 167 may be disposed between the second frame 15 and the third frame 18. The second OIS rolling member 167 may be accommodated in a second OIS rolling part 177 disposed between the second frame 15 and the third frame 18. The second OIS rolling member 167 is accommodated in the second OIS rolling part 177, and may be formed as a guide groove to be limited to movement in the second horizontal direction (the x-axis direction) perpendicular to the optical axis and perpendicular to the first horizontal direction (the y-axis direction). The second OIS rolling member 167 may reduce frictional force generated when the first frame 14 moves in the second horizontal direction (the x-axis direction).

In an example, the first frame 14 may be a lens holder 141 accommodating the lens barrel 11, the second frame 15 may be a support frame 145 disposed below the lens holder 141, and the third frame 18 may be a carrier 143 accommodating the lens holder 141 and the support frame 145.

The first OIS rolling part 176 may be formed at a corner of a surface of the support frame 145 facing the lens holder 141 in the optical axis direction (the z-axis direction). The second OIS rolling part 177 may be formed at a corner of a surface of the carrier 143 facing the support frame 145 in the optical axis direction (the z-axis direction).

In another example, the ball rolling part 170 may have a hole shape formed in the support frame 145. In this example, the rolling member 160 may be disposed to pass through the hole-shaped ball rolling part 170, and movement thereof in the optical axis direction (the z-axis direction) is limited while being accommodated in the ball rolling part 170, and it may be moved in the first or second horizontal direction (the y-axis direction or the x-axis direction).

The lens barrel 11, the first frame 14, and the driver 13 may be accommodated in the inner space of the housing 151. In an example, the housing 151 may have a box shape in which an upper portion thereof and a lower portion thereof are opened. The image sensor unit 19 may be disposed at a lower portion of the housing 151.

The image sensor unit 19 is a device that converts light incident through the lens barrel 11 into an electrical signal. In an example, the image sensor unit 19 may include an image sensor 191 and a circuit board 193 connected thereto, and may further include an infrared filter. The infrared filter blocks light in an infrared region among light incident through the lens barrel 11.

The cover 101 may be combined with the housing 151 to cover an outer surface of the housing 151, and may protect internal components of the camera module 10. Additionally, the cover 101 may shield electromagnetic waves. In an example, the cover 101 may be formed of a metal shield can to shield electromagnetic waves so that the electromagnetic waves generated by the camera module 10 do not affect other electronic components in a portable electronic device.

Figure 3:
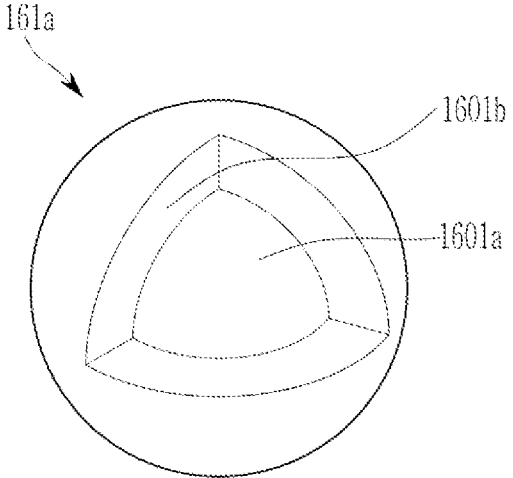
FIG. 3 illustrates a partially cut-away perspective view of a portion of a multi-layered rolling member among rolling members shown in FIG. 2.
Figure 4:
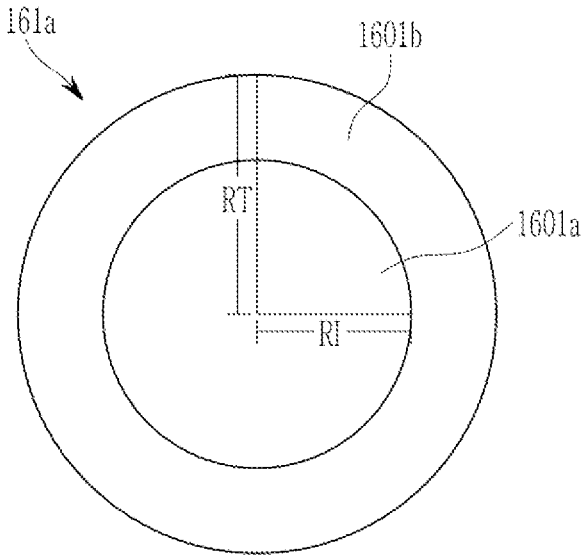
FIG. 4 illustrates a cross-sectional view of the rolling member shown in FIG. 3.

FIG. 3 illustrates a partially cut-away perspective view of a portion of a multi-layered rolling member among rolling members shown in FIG. 2, and FIG. 4 illustrates a cross-sectional view of the multi-layered rolling member shown in FIG. 3.

Referring to FIG. 3 and FIG. 4, the rolling member 160 may have a ball shape. The rolling member 160 may include multi-layered rolling members 161a and 162a (FIG. 5) having two or more materials. FIG. 3 and FIG. 4 illustrate one multi-layered rolling members 161a of the multi-layered rolling members 161a and 162a shown in FIG. 2. However, the discussions are equally applicable to other multi-layered rolling members 162a. Additionally, when the multi-layered rolling members 161a and 162a are disposed at different positions, the structures thereof may be the same.

In an example, the multi-layered rolling member 161a may have a multi-layer structure including two or more different materials. In an example, the multi-layered rolling member 161a may include a core part 1601a disposed at the inside thereof, and an outer part 1601b disposed outside the core part 1601a. The outer part 1601b may be disposed to surround the core part 1601a.

In an example, the core part 1601a may be made of a material having a lower modulus of elasticity than the outer part 1601b. In an example, the core part 1601a may include a plastic material such as polyethylene, polypropylene, polystyrene, an ABS resin, polyvinyl chloride, polyacetal, polytetrafluoroethylene, a phenol resin, an epoxy resin, polyurethane, and the like, and the outer part 1601b may include a highly rigid ceramic material. However, the one or more examples are not limited thereto.

The core part 1601a may be formed to occupy a predetermined ratio inside the multi-layered rolling member 161a. In an example, the core part 1601a may be formed to have a radius that is greater than or equal to 70% of the radius of the multi-layered rolling member 161a, and less than or equal to 90% of the radius of the multi-layered rolling member 161a.

At least one of the rolling members 160 disposed between the first frame 14 and the second frame 15 may be the multi-layered rolling member 161a. In an example, at least one of the OIS rolling members 166 and 167 may be a multi-layered rolling member 161a, and the multi-layered rolling member 161a may contact the first frame 14. In another example, the first OIS rolling member 166 and the second OIS rolling member 167 may each include at least one multi-layered rolling member 161a, and the multi-layered rolling member 161a may contact the first frame 14 and the second frame 15, respectively. In another example, at least one of the AF rolling members 161 and 162 may be a multi-layered rolling member 161a, and at least one multi-layered rolling member 161a may be disposed on each of the AF rolling parts 171 and 172 formed at both sides of the AF driving surface 1301.

Additionally, the rolling member 160 may include a single-layered rolling member made of one material.

Figure 5:
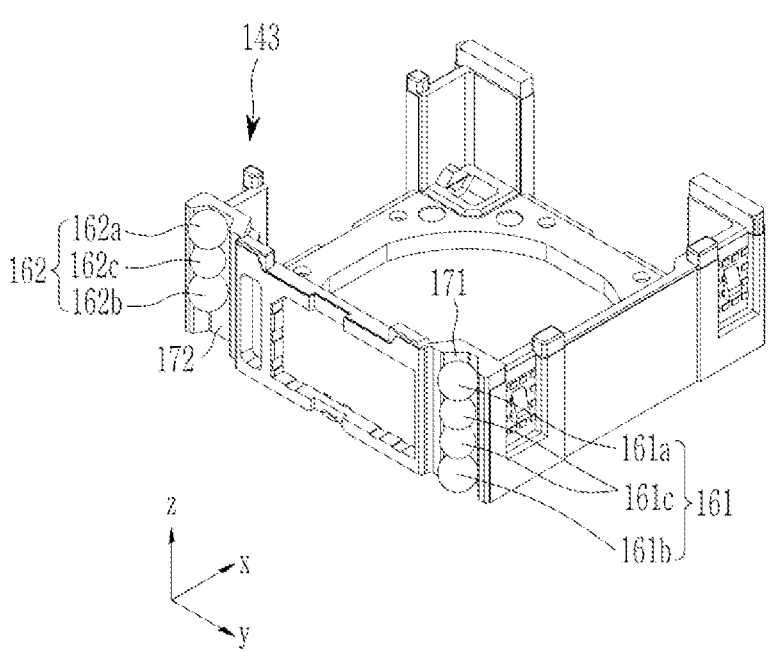
FIG. 5 illustrates a perspective view of a carrier shown in FIG. 2.

FIG. 5 illustrates a perspective view of a carrier shown in FIG. 2.

Referring to FIG. 5, the AF rolling parts or grooves 171 and 172 may be disposed in the first frame 14 or the second frame 15. FIG. 5 illustrates that the first frame 14 is the carrier 143 and the AF rolling parts 171 and 172 are disposed in the carrier 143, but the one or more examples are not limited thereto. The AF rolling parts 171 and 172 may extend in a direction parallel to the optical axis. The AF rolling parts 171 and 172 may be respectively disposed on both sides of the AF driving surface 1301 in the width direction.

The AF rolling members 161 and 162 may be accommodated in the AF rolling parts 171 and 172. In an example, two or more AF rolling members 161 and 162 may be disposed in each of the AF rolling parts 171 and 172. The plurality of AF rolling members 161 and 162 may be stacked in the optical axis direction (z-axis direction) along the extending direction of the AF rolling parts 171 and 172.

In an example, at least one of the outermost rolling members in the AF rolling parts 171 and 172 may be the multi-layered rolling member 161a. The multi-layered rolling member 161a may be disposed at a position close, or closer to, to a direction in which light is incident among the outermost positions. The single-layered rolling member may be disposed on the other side thereof.

A low modulus material that may configure the core layer of the multi-layered rolling member 161a has a longer impact time than a high modulus material, so an instantaneous impact when the same force is applied is lower. Therefore, when the same force is applied, a material with a low modulus of elasticity has a lower maximum impact than a material with a high modulus of elasticity.

In the multi-layered rolling member 161a, in accordance with the one or more examples, a material such as, but not limited to, plastic having a low modulus of elasticity may be disposed on the core part 1601a and a ceramic-based materials such as zirconin may be disposed on the outer part 1601b, so that while improving the impact resistance of the first frame by reducing the maximum impact amount, it is possible to simultaneously achieve an effect of preventing deformation by maintaining an external appearance of high rigidity.

In an example, the rolling members 161 and 162 disposed in the AF rolling parts 171 and 172 may have different sizes. For example, the rolling members 161a, 161b, 162a, and 162b disposed at both end portions may have a larger size than the rolling members 161c and 162c disposed between both end portions.

Experimental Example: Plastic Deformation after
Free Fall

Figure 6:
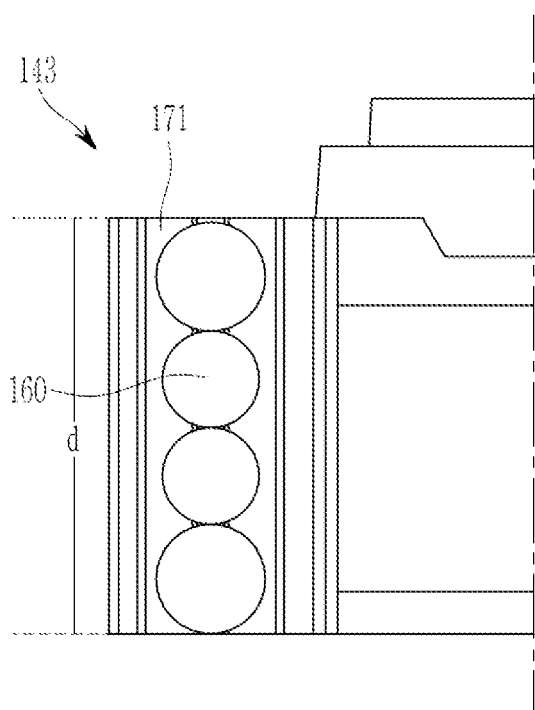
FIG. 6 illustrates a side view of a portion of a carrier used in an experiment.
Figure 7:
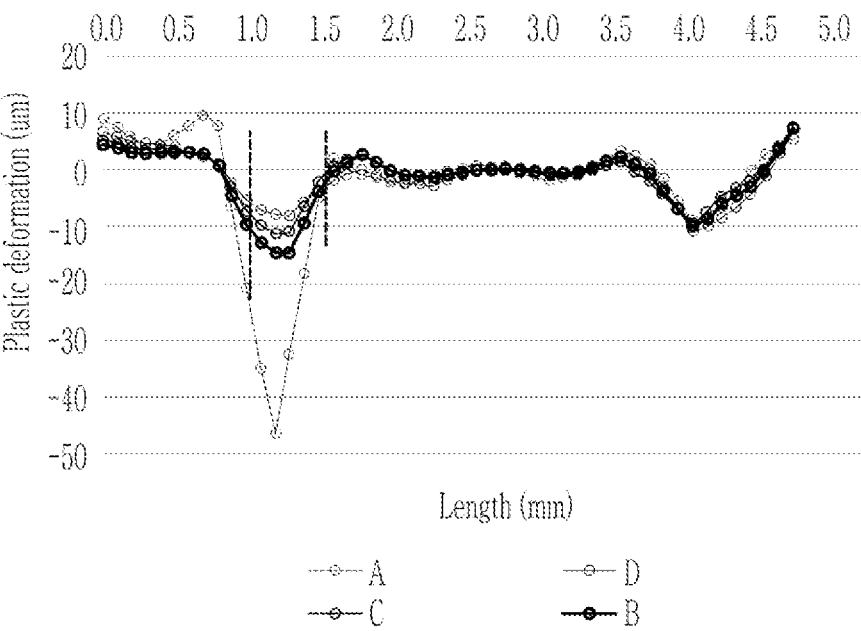
FIG. 7 illustrates a graph of plastic deformation of a carrier in an experiment.

FIG. 6 illustrates a side view of a portion of a carrier used in an experiment, and FIG. 7 illustrates a graph of plastic deformation of a carrier in an experiment.

Referring to FIG. 6, the AF rolling part 171 is formed on one side of the carrier 143 used in this experiment. Four rolling members 160 are disposed in the AF rolling part 171. The carrier 143 on which the rolling member 160 is disposed in this manner was freely dropped from a height of 1.5 m onto a SUS plate in a direction FD in which a lens can be mounted from above, and then a degree of plastic deformation of the carrier 143 according to a length d of the AF rolling part 171 was observed.

A total of four groups of rolling members 160 used in the experiment were A, B, C, and D. Group A was a comparative example, and was a ball bearing manufactured using a single ceramic material. Groups B, C, and D were all ball bearings manufactured using a plastic material for the core part 1601*a* and a ceramic material for the outer part 1601*b*. The rolling members 160 of groups B, C, and D were manufactured so that the diameters RI of the core part 1601*a* were 70%, 80%, and 90% of the overall diameter RT, respectively (see FIG. 4). The modulus of elasticity of the materials used was 13 Gpa for plastic and 94.5 Gpa for ceramic.

A length axis of FIG. 7 illustrates the length d to an upper end by constantly dividing the length d when the bottom surface of the carrier shown in FIG. 6 is 0.0. Referring to FIG. 7, in the case of group A, it can be confirmed that the plastic deformation of the carrier occurs significantly at the position overlapping the uppermost rolling member. It can be seen that this plastic deformation significantly decreased in group B and further decreased in groups C and D.

As can be seen in the experimental example, it can be seen that when the multi-layered rolling member 161*a* having a diameter ratio of 70% of the core part 1601*a* having a low modulus of elasticity was used, the plastic deformation of the first frame was significantly reduced, and when the ratio reaches 90%, the effect of preventing plastic deformation was evident. However, in order to prevent deformation that may occur due to pressure or the like, it may be necessary to form an outer part with high rigidity such that a diameter ratio thereof is 10% or more.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A lens driving apparatus, comprising:
a first frame which accommodates a lens;
a driver, connected to the first frame, and configured to generate a driving force to move the first frame in a first direction; and
a group of rolling members comprising at least one multi-layered rolling member including two or more different materials,
wherein the group of rolling members at least partially contacts the first frame,
wherein the at least one multi-layered rolling member comprises a core part and an outer part that surrounds the core part, and wherein the outer part is formed of a material that is different from a material of the core part, and
wherein the material of the core part has a lower modulus of elasticity than a modulus of elasticity of the material of the outer part.

2. The lens driving apparatus of claim 1, wherein the rolling members of the group of rolling members have a ball shape.

3. The lens driving apparatus of claim 1, wherein the core part includes a plastic material.

4. The lens driving apparatus of claim 1, wherein the outer part includes a ceramic material.

5. The lens driving apparatus of claim 1, wherein
a radius of the core part is equal to or greater than 70% of a radius of the at least one multi-layered rolling member, and equal to or less than 90% of the radius of the at least one multi-layered rolling member.

6. The lens driving apparatus of claim 1, further comprising:
a second frame disposed below the first frame; and
a first rolling groove disposed between the first frame and the second frame, and configured to accommodate at least a portion of the group of rolling members to guide a movement in the first direction.

7. The lens driving apparatus of claim 6, wherein
the first direction is an optical axis direction,
two or more rolling members of the group of rolling members are stacked in the optical axis direction, and are disposed in the first rolling groove; and
at least one of the rolling members disposed at an outermost portion of the first rolling groove is the at least one multi-layered rolling member.

8. The lens driving apparatus of claim 7, wherein the at least one multi-layered rolling member is disposed at the outermost portion of the first rolling groove closest to a direction on which the light is incident.

9. The lens driving apparatus of claim 6, wherein the driver comprises:
a first driver configured to generate a driving force to move the first frame in the first direction; and
a second driver configured to generate a driving force to move the first frame in a second direction different from the first direction.

10. The lens driving apparatus of claim 9, further comprising
a third frame disposed below the second frame, and
a second rolling groove disposed between the second frame and the third frame and configured to accommodate at least a portion of the group of rolling members to guide a movement in the second direction different from the first direction.

11. The lens driving apparatus of claim 10, wherein the first rolling groove and the second rolling groove are each configured to accommodate at least one or more of the at least one multi-layered rolling members.

12. An electronic device comprising the lens driving apparatus of claim 1.

13. A camera module, comprising:
a lens;
a first frame which accommodates the lens;
a second frame disposed below the first frame;
a driver, connected to the first frame, and configured to generate a driving force to move the first frame in a first direction; and
a plurality of rolling members that is disposed between the first frame and the second frame and at least partially contacts the first frame,
wherein at least one of the plurality of rolling members is a multi-layered rolling member including two or more different materials,
wherein the at least one multi-layered rolling member comprises a core part and an outer part that surrounds the core part, and wherein the outer part is formed of a material that is different from a material of the core part, and wherein the material of the core part has a lower modulus of elasticity than a modulus of elasticity of the material of the outer part.

14. The camera module of claim 13, wherein the core part includes a plastic material, and the outer part includes a ceramic material.

15. The camera module of claim 13, wherein a radius of the core part is equal to or greater than 70% of a radius of the multi-layered rolling member, and equal to or less than 90% of the radius of the multi-layered rolling member.

16. An electronic device, comprising the camera module of claim 13.

* * * * *